(12) United States Patent
Bacher et al.

(10) Patent No.: US 11,787,045 B2
(45) Date of Patent: Oct. 17, 2023

(54) ROBOT WITH AN INVERSE KINEMATICS (IK)-BASED CONTROLLER FOR RETARGETING INPUT MOTIONS

(71) Applicant: Disney Enterprises, Inc., Burbank, CA (US)

(72) Inventors: Moritz Niklaus Bacher, Zurich (CH); Lars Espen Knoop, Zurich (CH); Michael Anthony Hopkins, Pasadena, CA (US); Kyle Michael Cesare, Burbank, CA (US); Christian Gabriel Schumacher, Aarau (CH); Stelian Coros, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 218 days.

(21) Appl. No.: 17/224,012

(22) Filed: Apr. 6, 2021

(65) Prior Publication Data

US 2022/0226987 A1   Jul. 21, 2022

Related U.S. Application Data

(60) Provisional application No. 63/139,242, filed on Jan. 19, 2021.

(51) Int. Cl.
*B25J 9/16* (2006.01)
*B25J 13/08* (2006.01)

(52) U.S. Cl.
CPC ........... *B25J 9/1607* (2013.01); *B25J 13/088* (2013.01)

(58) Field of Classification Search
CPC ...... B25J 9/1607; B25J 13/088; B25J 9/1623; B62D 57/032; G05B 2219/40281
See application file for complete search history.

(56) References Cited

U.S. PATENT DOCUMENTS

2016/0243699 A1* 8/2016 Kim ..................... B25J 9/1605
2021/0001483 A1* 1/2021 Milenkovic .............. B25J 9/046

* cited by examiner

*Primary Examiner* — Adam R Mott
*Assistant Examiner* — Matthew C Gammon
(74) *Attorney, Agent, or Firm* — Dorsey & Whitney LLP

(57) ABSTRACT

A new controller for use in robots with kinematic loops as well as in most other types of robots (such as those with fully actuated kinematic trees). The controller includes an inverse kinematics (IK) module that implements a versatile IK formulation for retargeting of motions, including expressive motions, onto mechanical systems (i.e., robots with loops and/or without loops). Further, the controller is configured to support the precise control of the position and orientation of end effectors and the center of mass (CoM) (such as of walking robots). The formulation of the algorithms carried out by the IK module safeguards against a disassembly when IK targets are moved outside the workspace of the robot. A regularizer is included in the controller that smoothly circumvents kinematic singularities where velocities go to infinity.

18 Claims, 13 Drawing Sheets

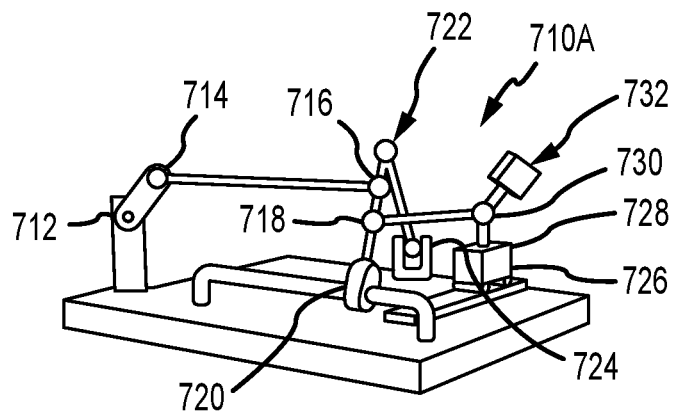
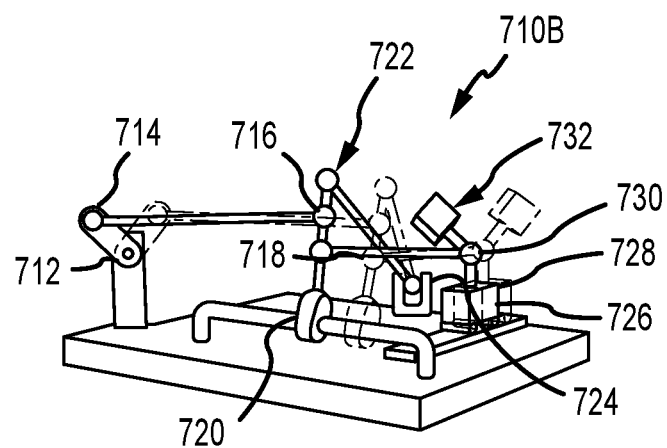
FIG.7A
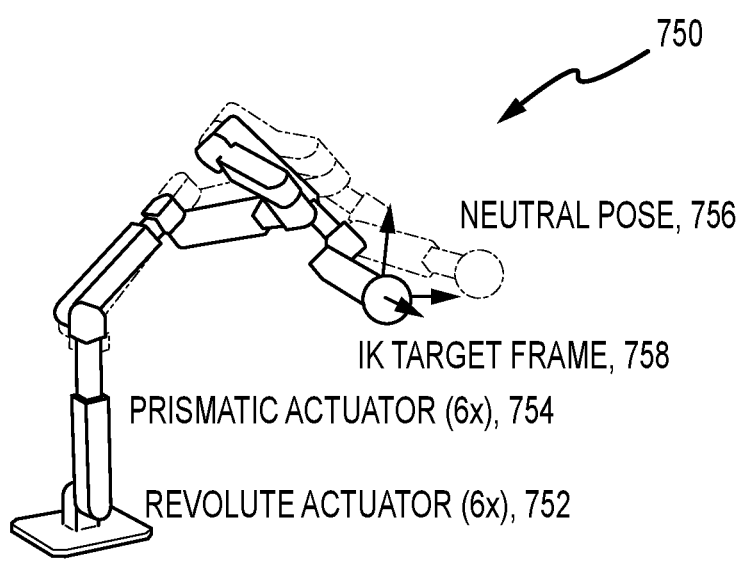
FIG.7B

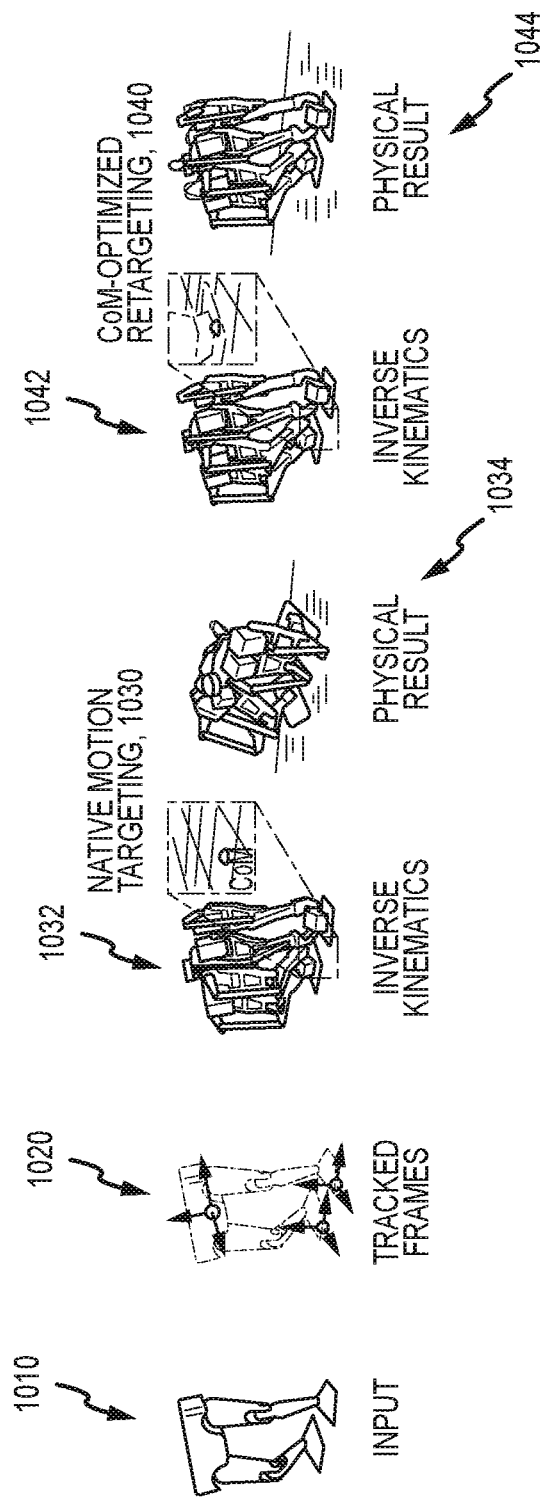

ROBOT WITH AN INVERSE KINEMATICS (IK)-BASED CONTROLLER FOR RETARGETING INPUT MOTIONS

CROSS-REFERENCE TO RELATED APPLICATIONS

This application claims the benefit of U.S. Provisional Application No. 63/139,242, filed Jan. 19, 2021, which is incorporated herein by reference in its entirety.

BACKGROUND

1. Field of the Description

The present description relates, in general, to robots (which may include nearly all types of robot designs or robotic systems) and associated control systems (or "controllers") for such robots, and, more particularly, to a controller (and a robot making use of such a controller) that is configured to make use of a versatile inverse kinematics (IK) formulation for retargeting input motions onto a robot via the controller's output (or control signals). The IK-based controller may be particularly well-suited for use with robots with kinematic loops but is useful with most other types of robots as well.

2. Relevant Background

There is an ongoing demand for improved controllers and control processes for robotic systems or "robots" that allow robot designers and operators to impart desired motions onto the robots. In many cases, it is desirable for the robots to closely simulate the motions of a human or other input motions or animations while retaining balance and other movement criteria. In many cases, retargeting of motions onto a robot can be challenging and be processor intensive or costly, and this is true for many general types of robots but especially true for robots with kinematic loops.

Robots with kinematic loops have several advantages over designs that are made up of a fully actuated kinematic tree. For example, these robots have superior stiffness, allow the placement of actuators where there is space, and, often, exhibit an advantageous payload-to-weight ratio. However, while there are clear mechanical advantages to robots with kinematic loops, actuated kinematic trees remain one of the more popular choices in legged robots and related systems due to the complexity of the design, control, and simulation of mechanisms containing loops.

For robots with loops or parallel robots, designs are commonly made of submechanisms for which, for example, a closed-form analytical model exists. In some cases, inverse kinematics (IK) can be formulated by interfacing between submodules. However, this modeling forgoes the true potential of robots with loops. This is true, in part, because for every type of submechanism a custom module has to be written from scratch, which unnecessarily restricts the mechanical design of custom robots.

SUMMARY

The inventors recognized that robots with kinematic loops are known to have superior mechanical performance, but, due to these loops, their modeling and control is challenging, which has limited more widespread use of robots with kinematic loops. With this in mind, a new controller was created by the inventors for use in robots with kinematic loops as well as in most other types of robots (such as those with fully actuated kinematic trees).

The controller includes an inverse kinematics (IK) module that implements a versatile IK formulation for the retargeting of motions, including expressive motions, onto mechanical systems (i.e., robots with loops and/or without loops). Further, the controller is configured (e.g., via design of the IK module or routines called by this module) to support the precise control of the position and orientation of end effectors and the center of mass (CoM) (such as of walking robots). The formulation of the algorithms carried out by the IK module safeguards against a disassembly when IK targets are moved outside the workspace of the robot. Further, even if every IK target is within the workspace, a designer or operator could ask for a motion the robot cannot perform, and the new IK module addresses such situations. For example, two IK targets could be attached to the robot at the ends of the two arms. If they are too far apart, the robot cannot perform the motion even though the individual IK targets could be matched perfectly with a sideways motion. A regularizer (which may be called by the IK module or be a subroutine of this module) is included in the controller that smoothly circumvents kinematic singularities where velocities go to infinity. The inventors have performed validation examples on physical robots to demonstrate the versatility and efficacy of the IK module and its algorithm designs in controlling (via its output or control signals) overactuated systems (including those with loops) and in retargeting (as part of generating the control outputs) an expressive motion onto a bipedal robot.

More particularly, a robot or robotic system is provided that makes use of inverse kinematics for retargeting motions onto the physical features of the robot or robotic system. The robot includes a kinematic structure with mechanical joints, bodies interconnected with the mechanical joints, and at least one actuator for imparting movements to the kinematic structure. The robot also includes a controller generating control signals to operate the kinematic structure to selectively move at least one movable body. To this end, the controller may include an inverse kinematics (IK) solver, and the controller processes input motions with the IK solver by solving inverse kinematics to retarget the input motions onto the kinematic structure with the control signals. Additionally, the IK solver may, in some embodiments, solve the inverse kinematics by applying hard constraints to at least one of the mechanical joints and soft constraints to an IK target associated with a point on the kinematic structure.

In some implementations, the soft constraints for the IK target are met during the solving of the inverse kinematics by minimizing distances between a target trajectory and a retargeted trajectory for the IK target while ensuring the retargeted input motions are physically feasible for the kinematic structure. In the same or other cases, the kinematic structure is configured to include at least one kinematic loop.

The robot may take other forms, such as fully actuated kinematic trees or the like. The bodies (which may be links and so on) may include at least one end effector, and the solving the inverse kinematics may include tracking movement of at least one end effector defined in the input motions in the retargeted input motions. The tracking of the movement of the at least one end effector may include tracking position and orientation of at least one end effector. In these or other embodiments of the robot, the IK solver may use a center of mass (CoM) module defining a trajectory objective for the CoM of the kinematic structure to follow while carrying out the retargeted input motions. Further, the solving of the inverse kinematics may preferably be configured to prevent velocity singularities when the kinematic structure operates based on the control signals.

BRIEF DESCRIPTION OF THE DRAWINGS

FIGS. 7A-7C illustrate a 1-DoF robot with all common joints used in validation, a serial chain robotic system used in validation, and a graph showing computation times related to input framerates;

FIG. 10 illustrates results of a validation demonstration for the IK formulation on a walker robot.

DETAILED DESCRIPTION OF THE PREFERRED EMBODIMENTS

Briefly, the following description describes a controller for a robot or robotic system that makes use of a new and versatile inverse kinematics (IK) formulation for retargeting input motions onto the robot. The robot may take nearly any known or to be developed form that includes fully actuated kinematic trees as well as kinematic loops. To this end, the controller, which may be onboard or offboard the robot, includes an IK solver or module (e.g., software run by one or more controller processors) that is configured to enable the kinematic control of general robotic systems with position and orientation objectives to precisely control the motion of end-effectors or bodies. The IK solver or module may also include or call a center of mass (CoM) module or subroutine that is configured to ensure that the kinematic control can be carried out using a CoM objective to keep the CoM within the support spanned by the contact of the robot with the ground.

Figure 1:
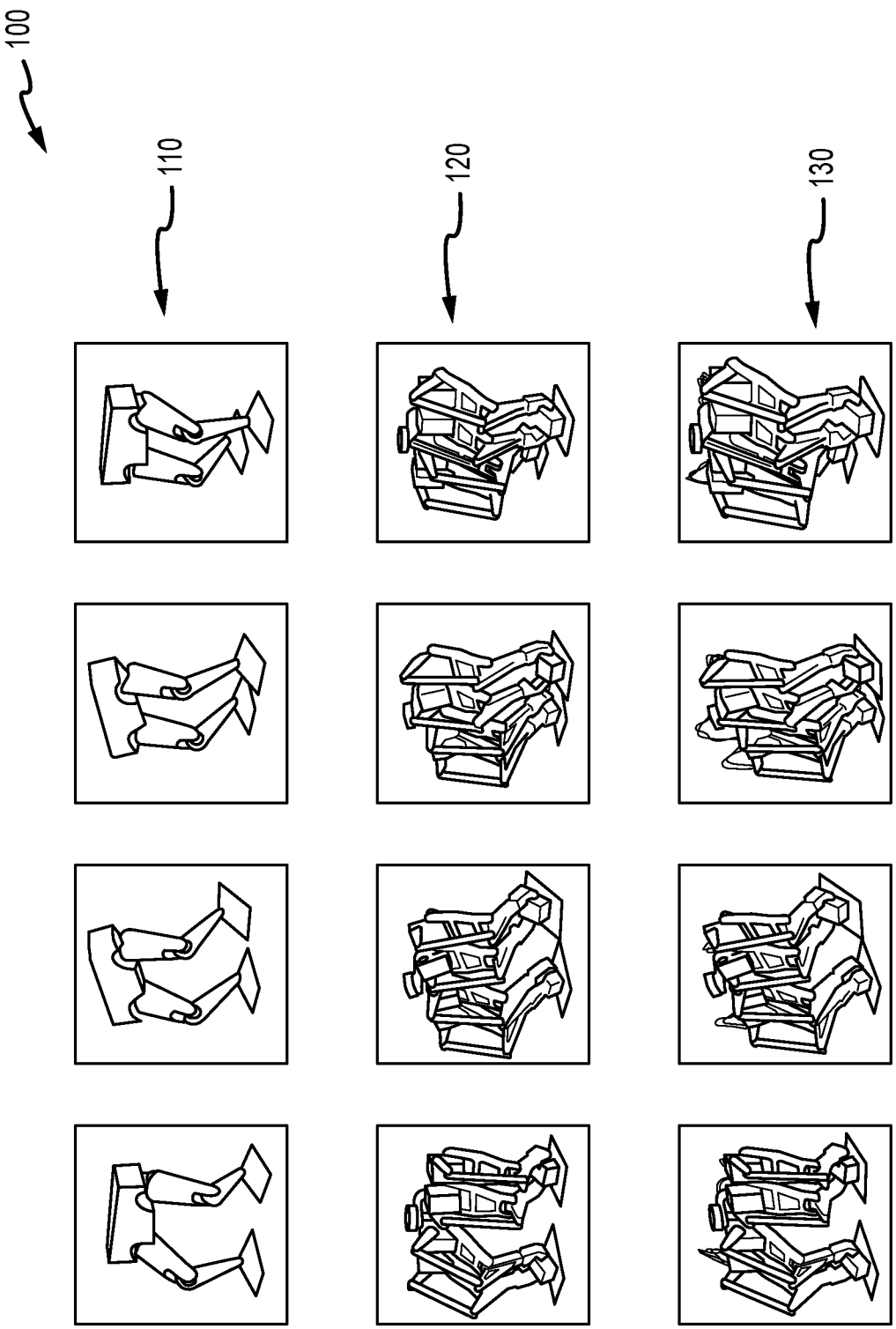
FIG. 1 illustrates exemplary data flow and operations of a controller and robot during operations of an IK-based controller of the present description.
Figure 2:
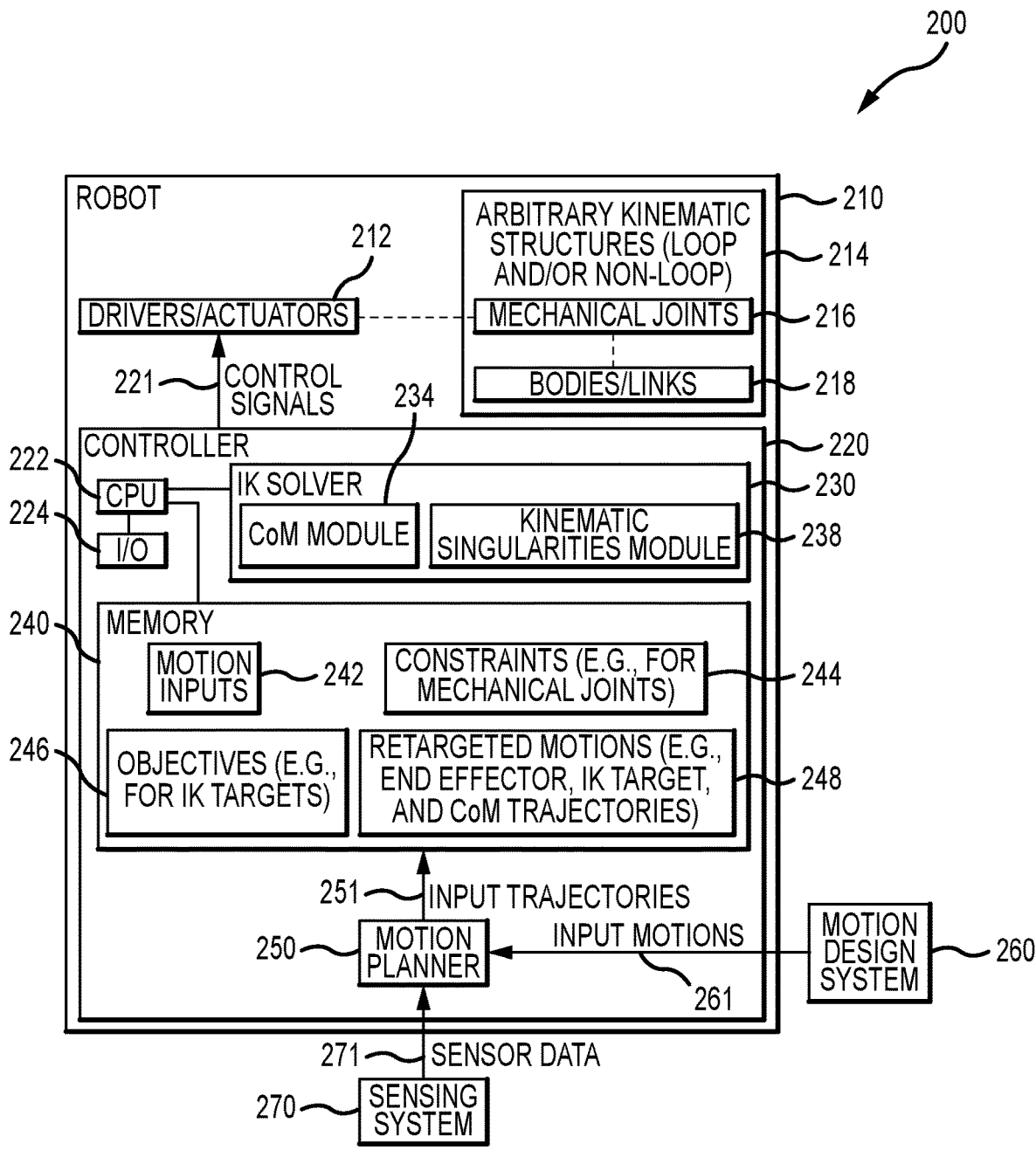
FIG. 2 is a functional block diagram of a robotic system of the present description showing the use of a controller configured with an IK-based controller to control operations of a robot with retargeted motions.

FIG. 1 illustrates exemplary data flow and operations (or "pipeline") 100 of a controller and robot during operations of an IK-based controller of the present description (such as that shown in FIG. 2). At 110, an input motion is shown with four exemplary frames. The controller performs IK retargeting of this motion as shown at 120 with four corresponding frames on a robot with kinematic loops (in this non-limiting example). Then, at 130, the use of the retargeting motion is shown being used, via control signals, to control movements of a physical robot with loops. In this pipeline/controller operations 100, the controller is shown to start with an input motion 110 (e.g., an animated walking cycle). At 120, the controller solves the IK problem of retargeting this motion 110 onto robots with arbitrary kinematic structures. Then, at 130, the inclusion of a CoM objective in the IK retargeting process allows the controller to better obtain a stable gait that can be executed on a physical robot. It was recognized by the inventors that a naïve motion retargeting, without the CoM objective, could cause the robot to fall over.

Briefly, the controller is configured to carry out algorithms or processes that combine a constraint-based formulation for mechanical joints with objective-based formulation for IK targets. This produces a returned IK solution that is as close as possible to the specified targets (e.g., in a least-squares sense) while also guaranteeing that the mechanical constraints of the robot are satisfied. Moreover, the controller is adapted to safeguard against kinematic singularities at which velocities go to infinity.

In this description, the new IK formulation is compared to an implicit approach where actuated degrees of freedom are solved for directly, with a first-order optimality constraint on forward kinematics. It will be seen from this comparison that, in contrast to the IK formulation taught herein, the mechanical system disassembles if not all IK targets can be met. Further, it will be shown that in the new IK formulation, only derivatives are needed (or building blocks) from a multibody kinematics implementation, which makes it relatively straightforward to add inverse kinematics support to existing forward kinematics codes.

Validation examples are used herein to demonstrate that the IK formulation works on mechanical systems containing all common types of active and passive joints. With three physical robot examples, the inventors have demonstrated how: (1) a rich dancing motion can be transferred over to a 6-DoF pair of legs with a single end-effector objective; (2) an expressive walking cycle can be retargeted onto a bipedal robot with complex loops with the use of the inventors' CoM objective; and (3) one can safeguard against velocity singularities when retargeting motions from a digital to a physical arm with fewer degrees of freedom. The new IK formulation can, hence, be understood as a first-order approximation of a dynamic model, without having to deal with force and torque transfer or with frictional contact.

FIG. 2 is a functional block diagram of a robotic system 200 adapted to use the IK formulations described herein to control a robot 210. The robot 210 may take a wide variety of forms to implement the IK control techniques and, in this regard, is generally shown to include a number of drivers/actuators (as these terms may be used interchangeably) 212 that interact with arbitrary kinematic structures 214 of the robot 200 that may include mechanical joints 216 and a number of bodies, links, or similar structural components 218 (e.g., components of an arm, hand, leg, foot, pelvis, a torso, and so on). The actuators 212, joints 216, and links 218 may be arranged in fully actuated trees (or non-loop configurations) or to have one or more kinematic loops. The actuators 212 of the robot 200 operate in response to control signals 221 generated by a controller 220, and these signals 221 may include recalculated or retargeted motions (such as trajectories of end effectors or links 218, IK targets, a CoM path or trajectory, leg or other angles, and the like that may be defined by dynamic joint trajectories).

The controller 220 may be onboard the robot (or its body) 210 as shown or be provided wholly or partially (such as with the IK solver 230) offboard. The controller 220 is shown to include a processor(s) 222 that manages operations of I/O devices 224, which allow an operator of the robot 210 to provide input to control operations of the robot 210, such as input motions 261 or sensor data 271 as shown in FIG. 2. The I/O devices 224 may include touchscreens or similar input components or may include wired or wireless transceivers. The processor 222 also manages access (e.g., storing and retrieving data) to memory/data storage 240. Further, the processor 222 executes code or runs software (that may be stored in memory/data storage 240) to provide the functionality of an IK solver 230, which is discussed in detail herein, which may include the use of a CoM module 234 and a kinematic singularities module 238 as well as a regularizer (not shown as separate algorithm/module from IK solver but may be provided in that manner in some embodiments).

The system 200 includes a motion design system 260 that may be any useful computer or computer system operable by an operator (e.g., an artist or director) to create and provide input motions or animations 261 to the robot 210. The robot 210 is shown to also include a motion planner 250 that processes or parses these input motions/animations 261 (such as the input motion 110 shown in FIG. 1) to obtain a set of input trajectories 251 that are output to the robot controller 220 for storage as motion inputs 242. In some cases, it is desirable for the robotic system 200 to provide real-time planning of motions for the robot 210, and, to this end, the system 200 may include a sensing system 270 with one or more sensors (e.g., video cameras and corresponding processing hardware and software) providing sensor data 271. This data 271 may provide feedback on the environment surrounding the robot 210 in real-time, and the motion planner 250 may be adapted to generate responsive motions suited to this sensed environment, with input trajectories 251 being output based on these determined or responsive motions.

The IK solver 230 is configured (e.g., with the new IK formulation described herein) to perform one or more algorithms to use the motion inputs 242 to provide retargeted motions 248 that are used to generate the control signals 221. The control over mechanical joints 216 is based on constraints 244 (or is a constraint-based formulation for retargeting) while the control over IK targets in the motion inputs 242 is based on objectives 246 (or is an objective-based formulation for retargeting). The retargeted motions 248 may include end effector and IK target trajectories. Further, the retargeted motions 248 may include a pathway or trajectory for the CoM of the robot 210 as may be determined by the CoM module 234 to keep the CoM within the support spanned by the contact of the robot 210 with the ground. Additionally, the 1K solver 230 may call or use the kinematic singularities module 238 so as to ensure that the retargeted motions 248 are generated so as to safeguard against kinematic singularities.

At this point in the description, it may be helpful to describe an example problem being addressed by the inventors and how their new IK formulation for robot controllers addresses this particular problem. When one is designing a new audio-animatronic figure, a first Maya rig may be created to explore how many functions should be provided to meet the artistic intent of the figure or robot designer. Thereafter, a first mechanical representation (e.g., a digital model in Solidworks or the like) is created and refined. To animate this mechanical representation, a second Maya rig may be manually created that implements the robotic constraints, and this second rig is refined and revised along with the mechanical representation through the design phase of the figure or robot. Instead of retargeting motion from an animated character onto a figure, the retargeting of motion data, which may be captured from an actress or actor performing the target animation, can also be used as input motions as part of the animation task of figures or robots.

Animatronics are robots that may be bolted to the ground, and linkages are used to place actuators where there is space or to utilize mechanical advantage to reduce required motor torques. This results in very complex assemblies (e.g., up to 180 links (or more) and 200 moving joints (or more) in a typical animatronic) that contain kinematic loops, which makes the task of creating rigs that implement these robotic constraints a time-consuming task. Hence, it would be desirable to be able to transfer motions from an animated rig that does not implement the robotic constraints or from motion capture data on complex robots automatically.

To this end, the inventors recognized that a controller is desired that uses an inverse kinematics formulation that: (1) transfers motion onto complex assemblies that may contain loops; (2) ensures that all the robotic constraints are fulfilled even when the transferred motion cannot be followed exactly by the robotic figure; and (3) provides the closest motion that the robot supports while keeping the motion smooth. Further, in the case of these and also autonomous robots, it is desirable to provide the artists/designers providing input animations or motions with real-time feedback on whether a particular motion is physically feasible (e.g., is balance maintained?), and the inventors recognized it would be desirable for the new IK-based controller to provide direct control over the center of mass (CoM) of the robot.

The inventors created an IK algorithm or process that fulfills all of the above requirements. The new IK process (or software/code that can be run by a controller or other processor) supports multibody systems with loops and articulated body systems as well as non-loop configurations for robots. A user can specify motion targets, e.g., in the form of points or frames, that are tracked over time or trajectories for the center of mass or a point in space the robot is supposed to track. The trajectories of points or frames can be extracted, in some cases by a motion planner, from a target animation that does not implement the robotic constraints or from motion capture data. The IK-based controller is configured to track corresponding points and frames on the robot and to minimize differences to target motions while guaranteeing that all constraints are satisfied at all times.

The IK formulation has been proven by the inventors to be able to transfer rich motions onto complex assemblies with loops with only a very few tracked points and/or frames. In one demonstration, the inventors were able to show use of the IK formulation on an autonomous robot to control the center of mass position over time, which enabled the rapid creation of animations that were physically feasible and that could be blended in when the robot was moving dynamically. The IK formulation implements the kinematic constraints of the robot as hard constraints, which means they are satisfied and ensures the robot is kept in a feasible state at any moment in time. The IK targets are implemented as soft constraints or objectives, which means they are satisfied as closely as possible given the robot kinematics. The operator or artist providing the input motions can be provided feedback during the animation tasks, and, if the IK targets cannot be fulfilled exactly, the artist can be provided control over which targets to give higher priority (e.g., by weighting of one or more of input motions or trajectories).

Prior to turning to the new IK formulation (carried out by a controller of the present description), it may be useful to first discuss related work and forward kinematics. There is a large body of related work on inverse kinematics in robotics as well as related fields such as computer graphics. Most IK formulations target serial or tree-like robots, and inverse kinematics for serial-parallel hybrid robots (or mechanical systems that contain kinematic loops) are less common despite their desirable properties such as increased accuracy, stiffness, and payload capacity. The inventors have mainly targeted the latter category of robots with their new IK formulation.

With regard to serial robots, tree-like robots are usually modeled as reduced or generalized coordinate formulations, and closed-form analytical, learning-based techniques and Jacobian-based numerical approaches are common. Targeting robotics control, others have introduced an IK that does not require a matrix conversion (for increased speed), that more robustly handles kinematic singularities, and supports multiple end effectors. Jacobian-based formulations have also been extended to handle joint limits, with Newton-based approaches handling them better in general. The inventors enable the control of the CoM position of the robot, and the IK formulation handles multiple targets gracefully. Further, in contrast to prior IK approaches, the new IK formulation supports arbitrary mechanical systems, which may (or may not) contain kinematic loops.

Similarly, a large body of work has focused on parallel robots (or Parallel Kinematic Machines (PKMs)). For most studied PKMs, the IK problem was kept relatively simple and was solved by dividing the mechanism into a number of simple kinematic chains, which were then tackled analytically. A central challenge, though, in the study of PKMs is the avoidance of workspace singularities. More recent work on PKMs has included where the kinematic analysis of an overactuated parallel robot is considered and where a formulation is provided that is applicable also to robots with redundant degrees of freedom. However, these approaches are not readily applicable to arbitrary robot topologies as considered for control by the inventors with their new IK formulation.

To present general robots with loops, maximal coordinates are commonly used. As a recent survey on serial-parallel hybrid robots pointed out, the kinematic analysis of generic series-parallel hybrid robots remains an open problem, let alone use of inverse kinematics in the control of such robots. For specific serial-parallel topologies, known solutions for building blocks (or submechanisms) could potentially be used (e.g., IK for a 6R manipulator). In some cases, hybrid approaches where the loops in mechanical systems are cut and consistency constraints are introduced have also received some attention by those in the robotics field. However, these mixed representations, where reduced and maximal coordinates are combined, are very complex. In contrast, the kinematics and inverse kinematics implemented by the inventors are applicable to general mechanical systems that are modeled as multibody systems, represented with maximal coordinates.

Analytic IK solutions are also common, but they are laborious and do not generalize to arbitrary mechanisms. There are relatively few examples in the literature of serial-parallel robots where the parallel elements cannot be treated as submodules in the serial chain. The inventors believe that one reason why such robots are not more widespread is their challenging inverse kinematics and the lack of suitable off-the-shelf IK solvers.

Before delving into the specifics of the new IK formulation, it may be useful to summarize how kinematics simulations are performed. To motivate and illustrate this representation, reference is made to the four-bar linkage 300 shown in FIGS. 3A and 3B. The four-bar linkage 300 is shown in its initial configuration in FIG. 3A and in a stepped configuration in FIG. 3B. The linkage is driven by a single actuator 310 and has three passive joints 312, 314, and 316. One of the four bars is fixed relative to the world frame as shown with bar 320. In the following description, the rigid body representation is first introduced along with a discussion of constraints the actuators and joints impose. Then, the description turns to how the unknown states can be solved for after the actuators are stepped.

In their work, the inventors represented the position of a rigid body in global coordinates with its CoM $c \in \mathbb{R}^3$. This simplifies the formulation of the CoM objective used in the new IK formulation. Moreover, it means that the new method can easily be integrated with common dynamics representations, where the use of frames centered at c is often preferable because they enable the decoupled treatment of the linear and angular motions in the Newton-Euler equations of the bodies. To represent a body's orientations, the inventors relied on 4-coordinate quaternions q, as they do not suffer from singularities. This comes at the cost of enforcing unit length constraints.

Summarily, the i-th component in an assembly is represented with a 7-coordinate state vector $s_i$ including the position and orientation of the body. Then, these are stacked for an n-body assembly to represent its maximal coordinate state with the state vector $s \in \mathbb{R}^{7n}$. For example, for the four-bar linkage 300 in FIGS. 3A and 3B, the number of components is four, and the state of the assembly is represented with a 24-vector s. After stepping the actuators, the state of the assembly is solved for so that all constraints are fulfilled. Hence, this state is considered unknown in forward kinematics.

Figure 4:
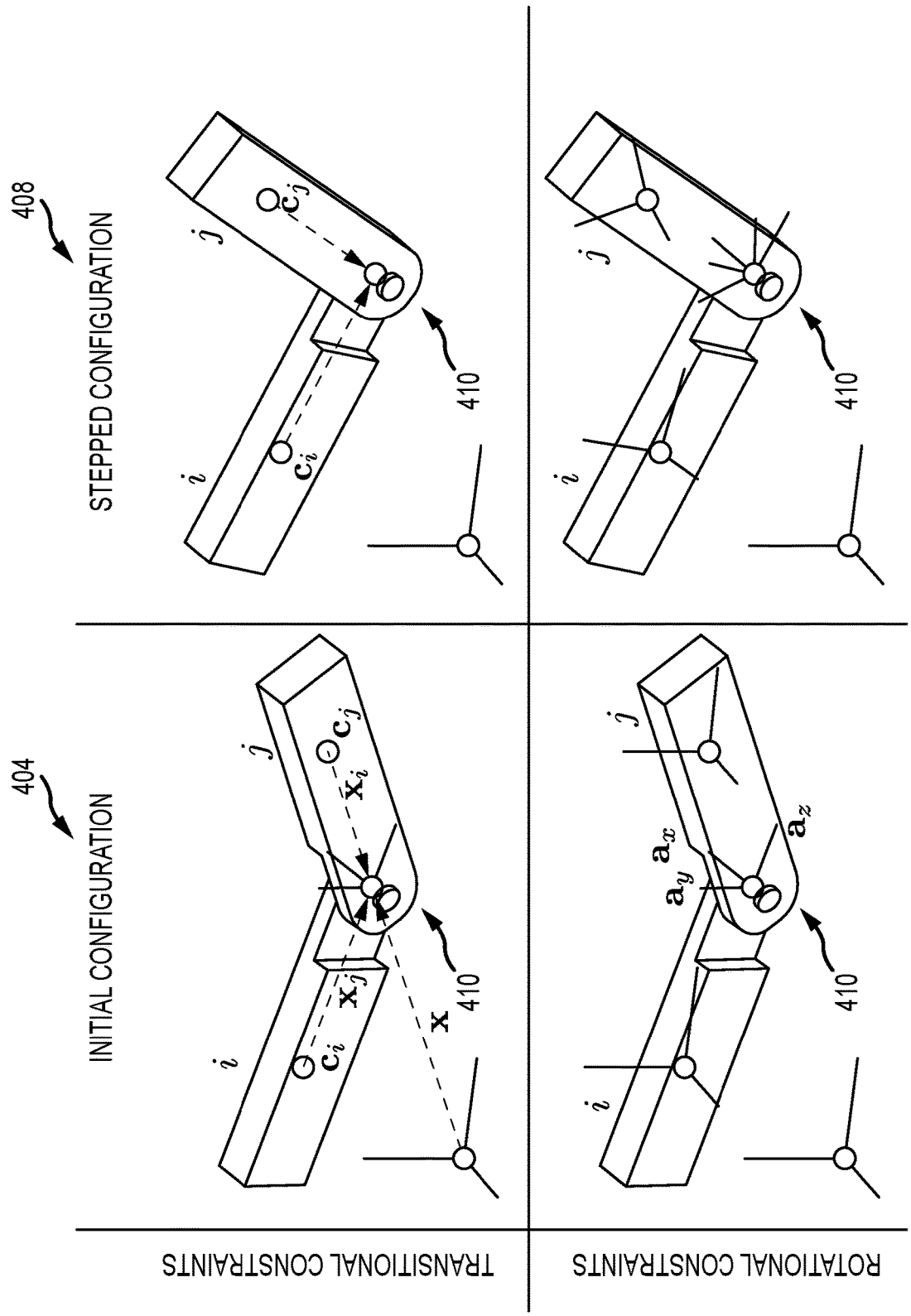
FIG. 4 illustrates a revolute joint in an initial configuration and in a stepped configuration.
Figure 5:
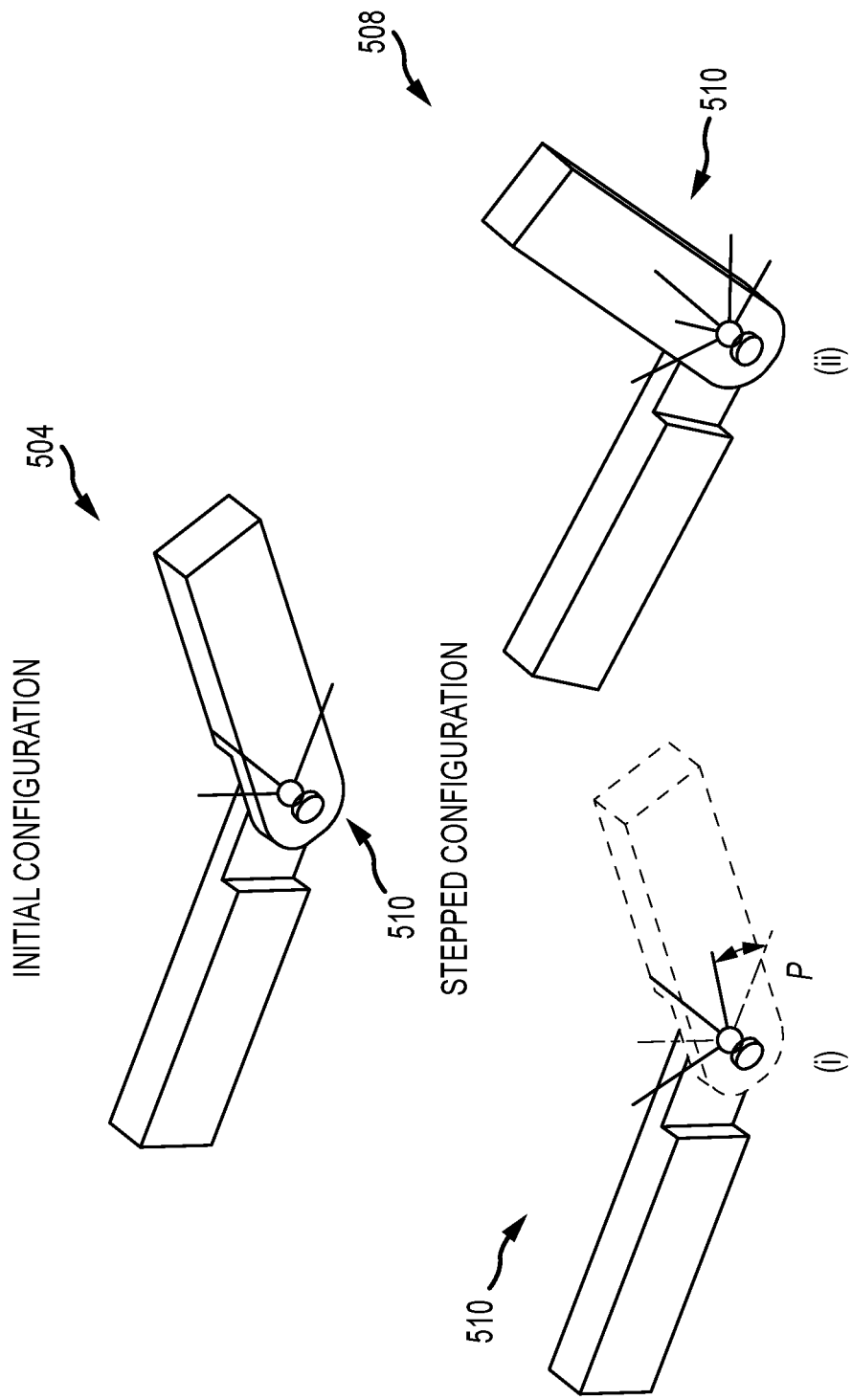
FIG. 5 illustrates a revolute actuator in its initial and stepped configurations.

Passive or active joints constrain the relative motion between pairs of bodies. To formulate constraints, the local frames that rigidly move with the bodies can be attached to either body i and j (as shown in FIGS. 4 and 5). These two frames can then be transformed to global coordinates. Restrictions can be imposed on their relative translations or rotations when solving for the unknown state for a stepped configuration. FIG. 4 shows at 404 a revolute joint 410 in its initial configuration and at 408 in its stepped configuration. To formulate constraints, local frames are attached to either body. After stepping the motors, the origin of frame i, transformed to global coordinates, has to equal the transformed origin of frame j (translational constraints). In addition, the transformed hinge axis $a_x$ on body i has to remain orthogonal to the other two transformed axes, $a_y$ and $a_z$, of frame j at all times (rotational constraints). FIG. 5 shows at 504 a revolute actuator 510 in its initial configuration and at 508 in its stepped configuration. By first rotating the local y-axis on body i by p about the local hinge axis $a_x$ (as shown at (i) in FIG. 5) and asking this axis, after transforming it to global coordinates, to remain orthogonal to the transformed z-axis of the frame on body j (as shown at (ii) in FIG. 5), the revolute joint constraints are complemented to form an actuator.

With regard to passive joints, it proved convenient to the inventors to assume that all bodies, and the global coordinate frame, have the same orientation in the initial configuration. This can best be shown through an example. When the orientations of bodies i and j are set to the identity, the three frame axes $a_x$, $a_y$, and $a_z$ are the same in global and local body coordinates (see FIG. 4 bottom row left). Moreover, the initial location of the joint in global coordinates, x, can be transformed to local coordinates, $x_i$ and $x_j$, by subtracting the initial positions of either body (see FIG. 4 top row left). Assuming the revolute axis to point in the direction of the x-axis in either local frame, one can formulate the constraint for a revolute joint by asking the transformed revolute axis on body i to remain orthogonal to the transformed y- and z-axes of body j (see FIG. 4 bottom row right):

$$\mathcal{J}(s_i, s_j) = \begin{bmatrix} R(q_i)x_i + c_i - R(q_j)x_j + c_j \\ (R(q_i)a_x) \cdot (R(q_j)a_y) \\ (R(q_i)a_x) \cdot (R(q_j)a_z) \end{bmatrix} = 0$$

Where R is the rotation matrix that is extracted from the unit quaternion with a variant of the Euler-Rodrigues formula.

It should be noted that this particular formulation, with dot products between pairs of transformed axes for rotation constraints, leads, in general, to the minimal number of constraints. A revolute joint constrains all but one rotation degree of freedom between the two bodies. Hence, the minimal number of constraints is five. Common joint types, such as Cartesian, cylindrical, fixed, prismatic, spherical, and universal joints, can be formulated analogously.

With regard to active joints, by parameterizing the remaining degrees of freedom, one can complement every joint type with less than six constrained degrees of freedom (all but the fixed joint) to form an actuator. For example, for a revolute actuator (see element 520 in FIG. 5), the remaining rotational degree of freedom can be parameterized about the revolute axis with a parameter p. To form a constraint, the y-axis is first rotated about the revolute axis in local coordinates of body i (as seen at (i) in FIG. 5), before transforming it to global coordinates and asking it to remain orthogonal to the transformed z-axis of body j (as seen at (ii) in FIG. 5):

$$\mathcal{A}(p, s_i, s_j) = \begin{bmatrix} \mathcal{J}(s_i, s_j) \\ (R(q_i)R[p, a_x]a_y) \cdot (R(q_j)a_z) \end{bmatrix} = 0.$$

To rotate the y-axis, the rotation matrix $R[p, a_x]$ is applied that represents a rotation of p about the revolute axis in local body coordinates of i. A prismatic actuator, and also less common actuators with more than one actuated degree of freedom, can be formulated analogously.

Figure 3:
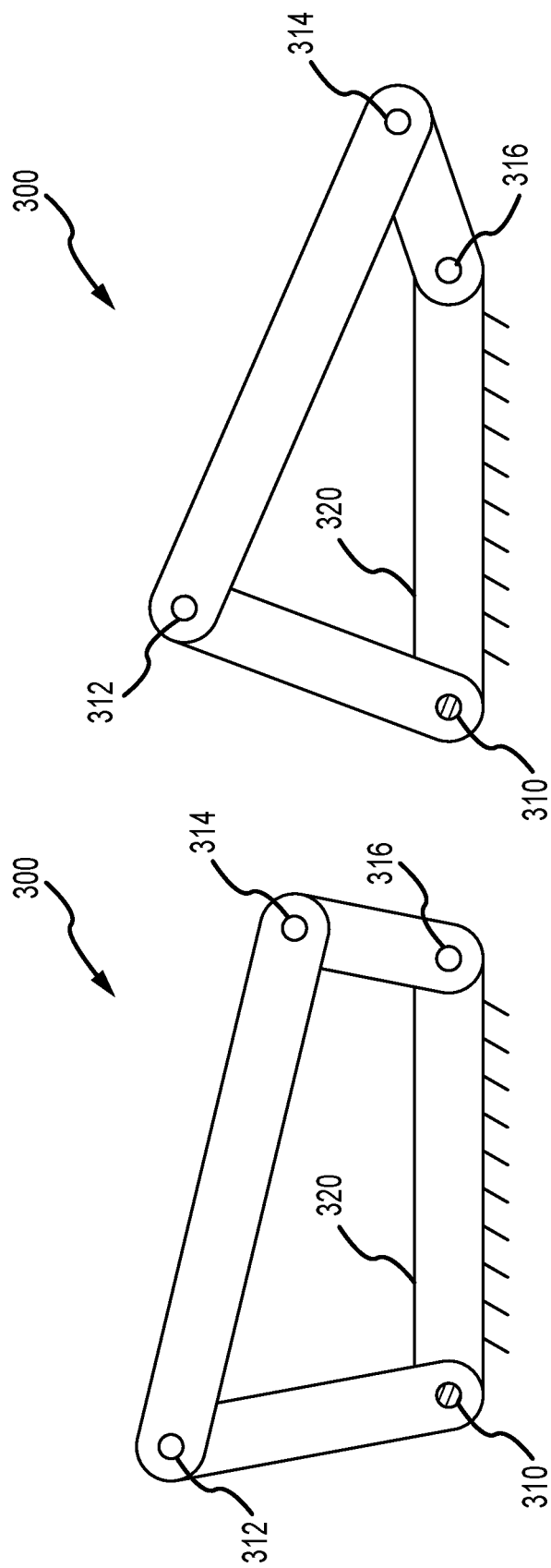
FIGS. 3A and 3B illustrate a four-bar linkage with a single actuator in an initial configuration and in a stepped configuration.

With regard to unary constraints, it should be understood that so far the discussion has concentrated on binary constraints that constrain the relative motion between pairs of bodies. However, to guarantee that the constraint Jacobian is full rank, it is useful to constrain the rigid body motion of the overall assembly. To this end, at least one body is fixed in space with six constraints of the form:

$$\mathcal{U}(s_i) = \begin{bmatrix} c_i - \bar{c} \\ \text{Im}(q_i) \end{bmatrix} = 0$$

where the position of the body is kept at its initial position $\bar{c}$, and the initially zero imaginary part of the unit quaternion that represents the body's orientation is kept at zero (see darker gray component 320 in FIG. 3).

Now, to solve for the kinematic motion, all actuation parameters are collected in a parameter vector p, and all joint, actuator, and unary constraints, together with n unit length constraints of the form $q_i \cdot q_i - 1$, in a constraint vector:

$$C_{FK}(p, s(p)) = 0$$

that is asked to remain zero after setting p to new values. Because the state of the assembly changes whenever changes are made to parameters, there is an implicit dependence, s(p), between the two.

It should be noted that there are often more constraints than unknowns, even though the joint and actuator constraints are formulated with the minimal number of equations. Assemblies that contain planar subassemblies result in overconstrained systems. For example, the four-bar linkage 300 in FIG. 3 where the four bodies amount to 4 times 7 or 28 unknown states. Revolute joints add five constraints, revolute actuators add six constraints, and there are four quaternion unit-length constraints along with one grounded component, which provides a total of 31 constraints. Only because all revolute axes point in the same direction, the motion is kinematically feasible.

Forward kinematics, in its general form, is therefore a nonlinear least squares problem:

$$\min_p f_{FK}(s) \text{ with } f_{FK}(s) = \frac{1}{2} C_{FK}(s)^T C_{FK}(s)$$

that we can solve with Gauss-Newton steps:

$$\left(\frac{\partial C_{FK}(s_k)}{\partial s}\right)^T \left(\frac{\partial C_{FK}(s_k)}{\partial s}\right) d_k = -\left(\frac{\partial C_{FK}(s_k)}{\partial s}\right)^T C_{FK}(s_k)$$

where $d_k$ is the k-th Newton direction along which one can perform a standard backtracking line search. Because the translational and rotational parts of the constraints are scaled differently, the constraint Jacobian can be conditioned unfavorably. To counteract this ill-conditioning, we scale all rotational constraints (e.g., the first three constraints in $\mathcal{J}$) with the average distance between pairs of passive or active joints. Because $f_{FK}$ is well-behaved and minimizations are started from previous solutions that are close to the optimum the Gauss-Newton algorithm is the preferred algorithm. However, for remote starting points, the Levenberg-Marquardt algorithm may outperform the Gauss-Newton method.

Figure 6A:
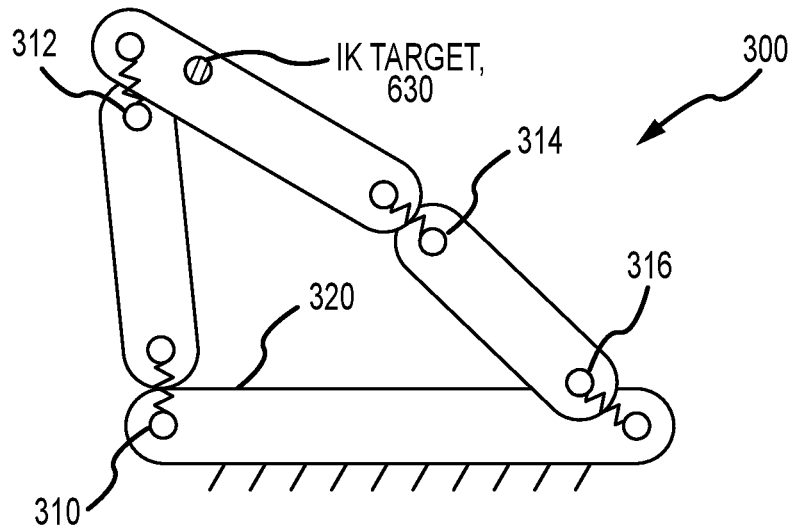
FIGS. 6A-6C illustrate, respectively, the four-bar linkage of FIGS. 3A and 3B with an IK target that cannot be reached and with a retargeting solution along with a robot with a kinematic loop controlled with position and orientation objectives (or a frame objective) along with control over the CoM location.
Figure 6B:
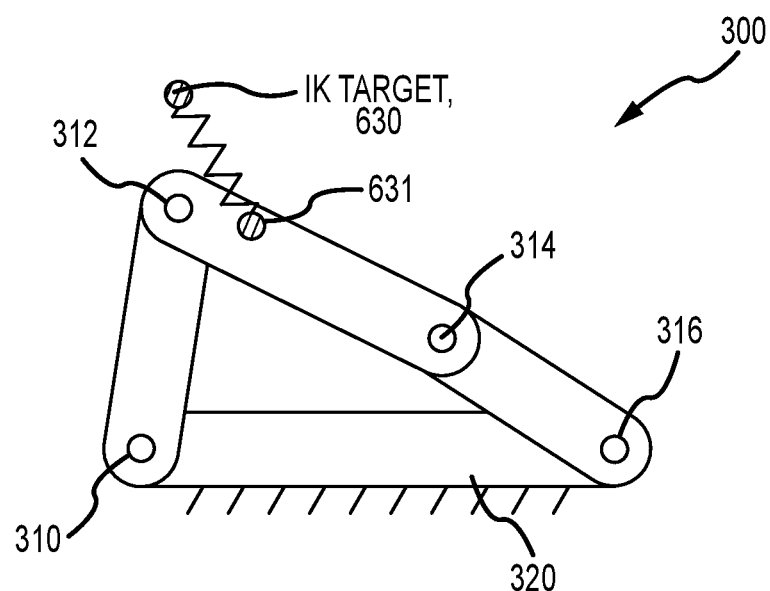
Figure 6C:
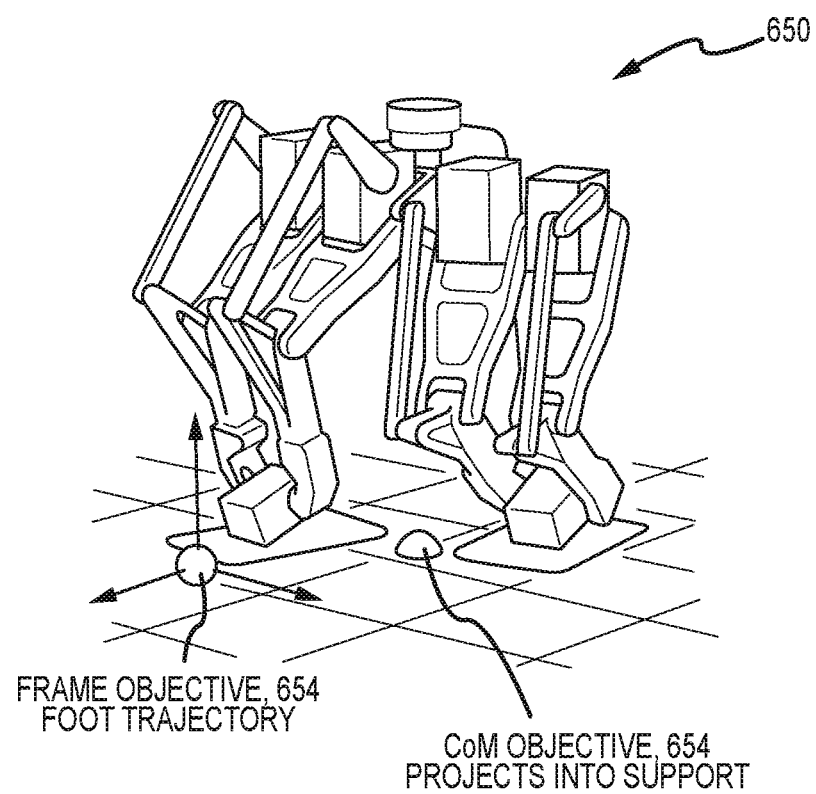

For inverse kinematics (IK), the problem is reversed. Instead of solving for the state after updating the actuation parameters p, it is desirable to find optimal actuation parameters, and indirectly also the assembly state, such that a single end effector or several end effectors (e.g., feet of a legged robot) follow a desired trajectory. FIGS. 6A and 6B illustrate, respectively, the four-bar linkage 300 of FIGS. 3A and 3B with an IK target 630 than cannot be reached and with a retargeting solution (or new 1K target) 631. FIG. 6C illustrates a robot 650 with a kinematic loop that is controlled using the new 1K formulation with position and orientation objectives 654 (or a frame objective defining an end effector trajectory (e.g., a foot of the robot 650)) along with control over the CoM location as shown with CoM objective 658, which projects into the support of the robot 650.

A problem addressed by the inventors' IK-based controller is to safeguard against parameter configurations that are not physically feasible. For example, for the four-bar linkage 300 in FIG. 6A, a full rotation of the revolute actuator 310 (e.g., to meet the IK target 630) is not possible without causing a disassembly. To make the new IK-based controller (or IK solver for such a controller) a versatile tool in different robotic animation tasks, the inventors added the support of a sufficiently complete set of IK targets, including IK target 631 which is feasible as shown in FIG. 6B and located at a minimal distance to the original IK target 630 while the robot 300 remains in an assembled state.

In addition to tracking end effector positions and orientations, the inventors added a CoM objective to their IK-based control software or IK formulation. This means that the 1K formulation can ensure that the CoM projects into the support spanned by dynamically changing contact areas with the ground (as shown at 658 for robot 650 in FIG. 6C, enabling the IK processing pipeline to be used for quasi-static walking (as shown in pipeline 100 of FIG. 1). Further, if actuation configurations are physically feasible, IK targets should be satisfied exactly. Otherwise, if not all of the targets can be satisfied simultaneously, the IK controller provides the user to provide input (weighting or the like) to have control over their relative importance.

With regard to specifying IK targets, the inventors determined it was preferable to formulate IK targets as objectives rather than hard constraints. To formulate IK objectives, frames are attached to individual bodies i (as seen in FIG. 6C with the frame objective 654). Frames are specified in global coordinates, with respect to the initial configuration. The initial position of the frame, x, is transformed to local body coordinates by subtracting the initial position of body i, resulting in the position $x_i$. Because all orientations of all bodies are set to the identity in the initial configuration, the three global frame axes $a_x$, $a_y$, and $a_z$ are the same in local coordinates.

With regard to frame objectives, to penalize differences between the current position of a frame and a target position $\hat{x}$, the position objectives are minimized to the form:

$$f_{pos}(s) = \tfrac{1}{2}\|R(q_i)x_i + c_i - \hat{x}\|^2$$

and with orientation objectives:

$$f_{ori}(s) = \sum_{a \in \{x,y,z\}} (1 - (R(q_i)a_a) \cdot \hat{a}_a)$$

in which differences between frame and target orientations are penalized.

Together, these two objectives can be used to formulate frame objectives. With 3-component weights $w_{pos}$ and $w_{ori}$, which vary per IK target and weigh the relative importance of the position error along the three global coordinate axes, and the error about the three local frame axes, the user is provided with a fine-grained control over tradeoffs between the individual objectives. By setting a subset of weights to zero, only a single axis or two axes objectives can be formulated.

Now, with regard to a CoM objective, to enable control of the CoM of the robot, differences between a user-specified target $\hat{c}$ and the mass weighted sum of the positions of the individual bodies can be penalized as follows:

$$f_{CoM}(s) = \frac{1}{2}\left\|\left(\sum_{i=1}^{n}\frac{M_i}{M}c_i\right) - \hat{c}\right\|^2$$

where M is the sum of all body masses $M_i$. Like for the position objectives, a 3-weight vector $w_{CoM}$ can be introduced to separately control the error along the three global coordinate axes. For example, for the walker example (see, FIG. 10), the vertical component of this objective can be disabled.

For forward kinematics, actuation parameters are set to new values, and then the state vector is solved for that minimizes the objective $f_{FK}$. At the minimum, the gradient of the forward kinematics objective is zero. Solving for the actuation parameters one may consider involve using an implicit formulation, but the inventors determined it is preferable to use a state-based formulation.

For an implicit formulation, a first inverse kinematics formulation may involve enforcing first-order optimality of the forward kinematics as a constraint. Then, the IK objective with the implicitly defined state may be evaluated that minimizes $f_{FK}$:

$$\min_{p} f_{IK}(s(p)) \text{ s.t. } \nabla_s f_{FK}(p, s(p)) = 0.$$

This problem can be solved with a standard quasi-Newton method by enforcing the constraints implicitly. To this end, forward kinematics is first performed whenever the IK objective, or its gradient, is evaluated. To compute the analytical gradient, the chain rule is applied and the implicit function theorem is used to compute the sensitivity of the state with respect to the parameters. In a small neighborhood around the FK solution, the derivative of the first-order optimality constraint remains zero such that:

$$\nabla_p f_{IK} = \frac{\partial f_{IK}}{\partial s}\frac{ds}{dp} \text{ with } \frac{ds}{dp} = -\left(\frac{\partial^2 f_{FK}}{\partial s^2}\right)^{-1}\frac{\partial^2 f_{FK}}{\partial p \partial s}.$$

In evaluations of the IK gradient, the Jacobian of $f_{FK}$ is needed, besides the Hessian of the FK objective, with respect to the state and actuation parameters. All necessary derivatives can be computed with a symbolic differentiation package. To keep the formulation general, symbolic derivatives of each individual constraint type are taken, and the gradients, Jacobians, and Hessians are assembled for a specific assembly at runtime.

However, the first-order optimality constraint does not guarantee the FK objective evaluates to zero, which means that the FK constraints $C_{FK}$ equal zero. When setting the actuation parameters to values that are not physically feasible, FK returns the minimal norm solution. If one asks for IK targets that are not physically feasible, this implicit formulation will converge to a solution where all IK targets are fulfilled, but the robot is in a disassembled state (as shown in FIG. 6A).

To safeguard against parameter configurations that are not physically feasible, the new IK formulation proposed by the inventors relies on a state-based formulation, and actuation parameters are read off in a post-processing step. To this end, every active joint is replaced with its corresponding passive joint. More formally, all constraints $\mathcal{A}$ that depend on the actuation parameters p are replaced with the corresponding passive joint constraints $\mathcal{J}$ in $C_{FK}$, resulting in the reduced constraint vector $C_{IK}$. For example, for the four-bar linkage example, the revolute actuator is replaced with revolute joint, thereby reducing the overall number of constraints from thirty-one to thirty.

This procedure turns the robot to be controlled into a "puppet" that would collapse under gravity. Such a condition is desirable for the following reasons: (1) it enables the movement of individual components with IK objectives without resistance from actuators; and (2) allows an optimization problem to be formulated directly on states as:

$$\min_s f_{IK}(s) + R(s) \text{ s.t. } C_{IK}(s) = 0$$

where the robot is enforced to remain in an assembled configuration with a set of equality constraints and where $f_{IK}(s)$ sums up all IK objectives. Because the IK objectives may not fully prescribe the robot state, a regularizer $R(s)$ is added to "choose" a solution in this subspace.

A regularizer that leads to intuitive solutions keeps the current state close to the previous state $\bar{s}$ of the robot:

$$R_{state}(s) = \frac{1}{2}\|s - \bar{s}\|^2.$$

This regularizer ensures that the problem is always well-posed, even if only a single IK objective is specified. Hence, this formulation provides an ideal tool to iteratively explore how to best transfer a motion over to a robot. Another advantage of the state-based formulation is that only building blocks from forward kinematics (e.g., only derivatives of constraints with respect to states) are needed, which makes it significantly easier to add IK support to an existing forward kinematics implementation. For optimization, standard line search Sequential Quadratic Programming (SQP) may be used.

After optimization, the actuation parameters from pairs of states of neighboring bodies are read off. To disambiguate and return the "correct" angle, extracted angles are compared to previous angles for rotational degrees of freedom and multiples of a are added or subtracted to obtain a temporarily consistent trajectory.

As illustrated and discussed below with the retargeting of an arm motion onto a boxer character in FIG. 8, velocities of individual bodies can go to infinity even though the end-effector is moved slowly and continuously in Cartesian space. One could use the state regularizer to stay a safe distance away from such kinematic singularities, but the weight $w_{state}$ would have to be set to a high value, which may result in retargeting results that look like the robot is moving through a viscous fluid. Hence, the inventors decided that a more fine-graded control would be advantageous.

Further, while one could formulate standard actuator-centric constraints to keep the actuator velocities within the limits supported by the hardware, some embodiments of the IK-based controller instead favor a body-centric regularization. Specifically, as soon as a hard constraint becomes active, the optimization "walks" along the constraint manifold until the next constraint becomes active, which leads to undesired discontinuities in the retargeting result. With a regularizer, the user is provided with better control over the smoothness of the resulting motion and can distribute the "limits" among the affected components. By lowering the bound at which the regularizer becomes active, solutions are always obtained where all actuator velocities remain in the required limits as demonstrated below.

To penalize angular velocities from taking on too high of values, the dot products are computed of the three frame axes of the current orientation of the body (columns of $R(q_i)$) and the corresponding frame axes of its previous orientation (columns of $R(\bar{q}_i)$). If these dot products (compactly expressed with the trace operator) become too small, the regularizer:

$$R_{vel}(s) = \sum_{i=1}^n g_{reg}(3 - tr[R^T(\bar{q}_i)R(q_i)])$$

becomes active where the function $$g_{reg}(x) = \begin{cases} \ln\left(\frac{x}{t_{vel}}\right)^3, & \text{if } x > t_{vel} \\ 0, & \text{otherwise} \end{cases}$$

ensures that the regularizer, and its gradient, are only taking on non-zero values above a user-specified threshold $t_{vel}$. A similar regularizer could also be formulated and used for body positions, if desired. With a weight $w_{vel}$, the importance of the regularizer can be controlled relative to $f_{IK}$ and $R_{state}$.

The new IK-based controller or IK processing pipeline was tested or validated with three examples that highlight different aspects and functionality of the IK formulation. For all the examples, the input to the pipeline was a digital animation created using Autodesk Maya, from which the relevant tracking frames were extracted using a custom script. Then, a custom Solidworks plugin was used to extract the kinematic models directly from the CAD models of the robot to be controlled. For all the motions, the input animation was sampled at 1200 frames per second, and all the robots used Dynamixel XH-430 actuators, with regularization and objective weight set to unity (unless otherwise noted).

Key statistics for the three demonstration cases include: (1) the boxer character (see FIGS. 8A-8C) had four actuators, five components, one frame-type IK target, and an algorithm runtime per time step of 0.14 ms; (2) with the velocity regularization switch on, an algorithm runtime per time step of 0.23 ms was measured for the boxer character; (3) the dancer character (see FIG. 9) had eight actuators, 4 passive joints, 12 components, one frame-type IK target, and an algorithm runtime per time step of 0.68 ms; and (4) the walker character (see FIG. 10) had twelve actuators, 24 passive joints, 31 components, three frame-type IK targets and one center of mass (CoM) target, and an algorithm runtime per time step of 13.99 ms.

To demonstrate that the pipeline or IK-based controller supports all common joint types (e.g., to provide validation), the inventors created a 1-DoF example mechanism that incorporates all common joints. An IK target was attached to the end effector, and the IK was solved on the mechanism. The mechanism 710A and 710B can be seen moving from a first state to a second state in FIG. 7A to meet an IK target 740. The mechanism or robot 710A, 710B includes a revolute actuator 712, revolute joints as seen at 724, spherical joints 714, 722, and 730, universal joints 716 and 718, a cylindrical joint 720, a prismatic joint 726, a fixed joint 728, and a parallel joint 732 (linked to motor crank). When specifying a target motion on the end effector 740 as shown between 710A and 710B, the resulting IK problem can be solved using the techniques described herein.

Figure 7C:
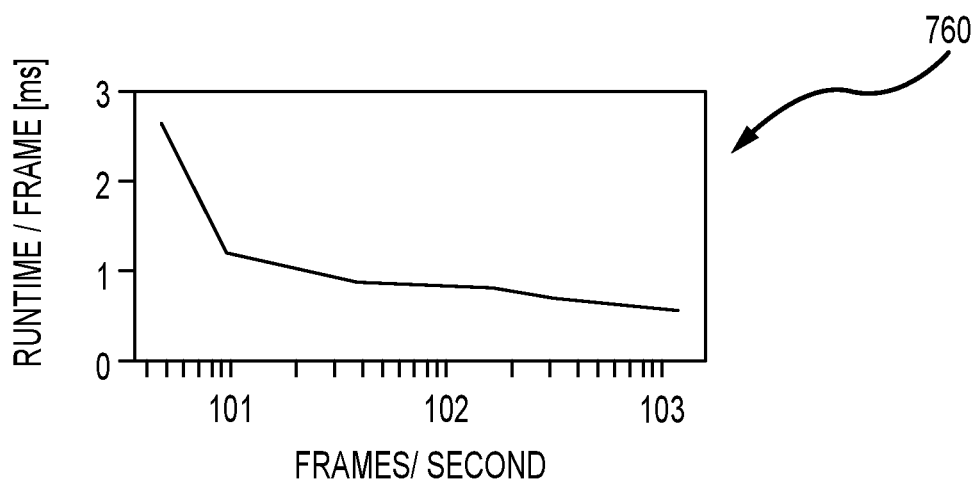

FIG. 7B illustrates a serial chain mechanism or robot 750 combining 6 revolute actuators 752 and 6 prismatic actuators 754. A neutral pose 756 and an IK target frame 758 are shown to illustrate the tracking of a single frame at the end effector. Particularly, the validation or demonstration involved running the IK solver or formulation for a single frame attached to the end effector. Note, with 12 DoFs, a single frame is sufficient to fully constrain the state of the robot 750, and the regularizer that pulls the robot 750 toward the previous state makes the problem well-posed. FIG. 7C illustrates with graph 760 computation time per frame for changing input framerate. These results were part of the inventors' investigation of how the IK performance changes with the input framerate, by subsampling the animation for the "dancer" robot. The finding was that as the framerate was reduced, there is only a slight increase in the computation time. At lower framerates, the performance of the new IK formulation was significantly faster than real-time.

Figure 8A:
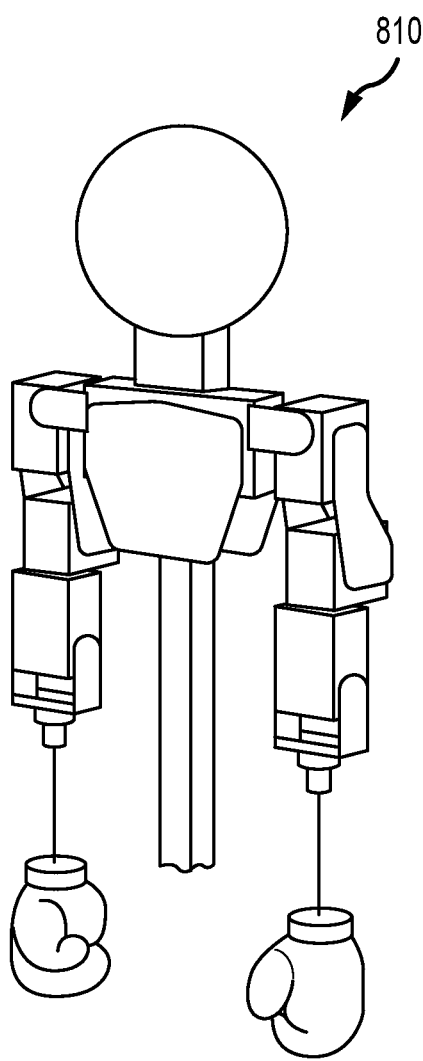
FIGS. 8A-8C illustrate a simulated boxer character or robot, a physical robot (both in neutral poses), and a plot of the joint velocities over time.
Figure 8B:
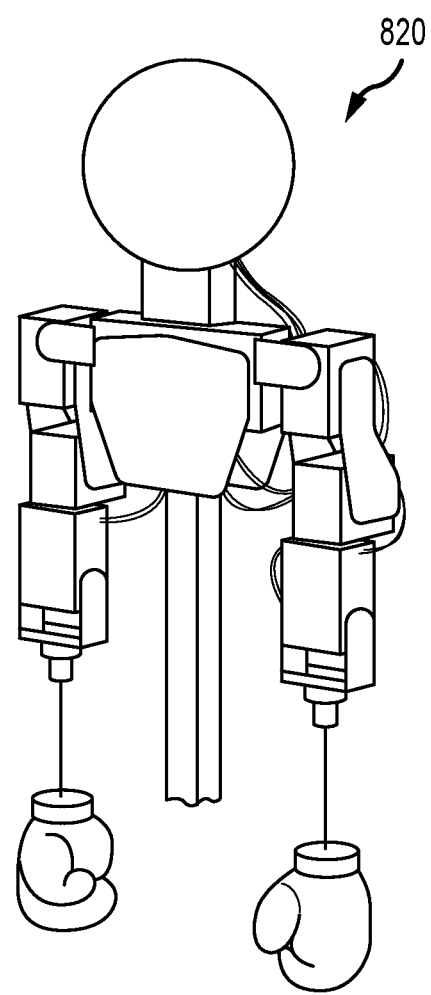
Figure 8C:
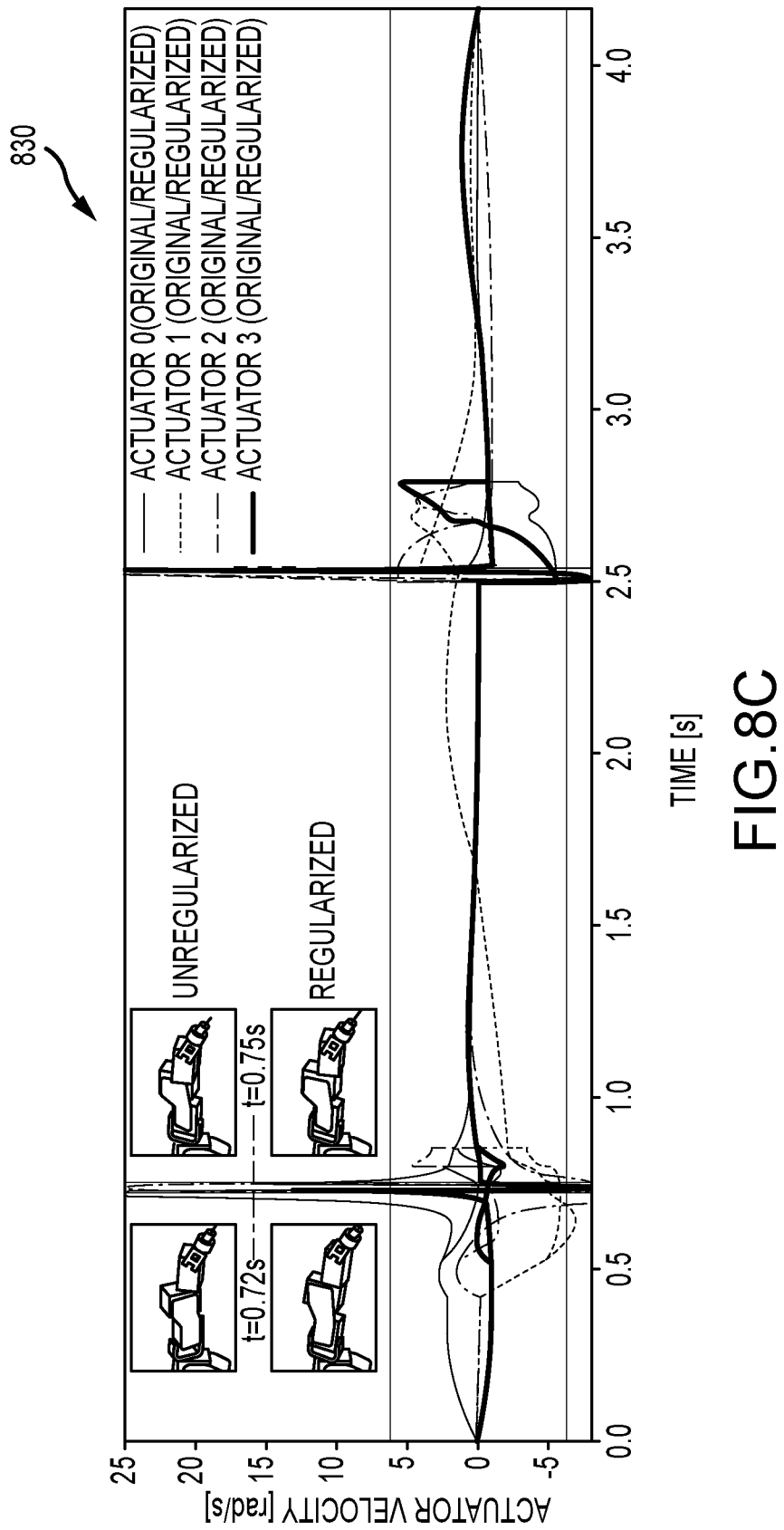

The new pipeline or IK solver process supports arbitrary kinematic structures, which includes serial robots. As an example, the inventors retargeted an arm motion onto a 4-DoF arm of a boxer robot. FIGS. 8A-8C illustrate a simulated boxer character or robot 810, a physical robot 820 (both in neutral poses), and a plot 830 of the joint velocities over time (for the unregularized version (shown with dotted lines) and regularized versions (shown with solid lines). The inset views in plot/graph 830 show the configuration change of the robot before and after the velocity spike, with motors with lighter shading indicating that the velocity limit is exceeded.

In the tested robots 810 and 820, the shoulder joint was a 3-DoF design and can exhibit a kinematic singularity. This is also representative of standard robot arms. A single tracking frame was placed at the robot end effector for tracking both position and orientation. To demonstrate how the velocity regularizer avoids singularities, an input animation was generated that moves through the kinematic singularity. In the animation or motion input 810, which uses a spherical joint at the shoulder, the angular velocities were smooth and bounded. However, a naïve motion retargeting led to discontinuous motor profiles with high peak velocities. By increasing the velocity regularizer weight, the IK controller software was able to circumvent the singular configuration and obtain motor profiles that are smooth and well within the velocity limits of the hardware. Plot 830 shows the joint velocities over time for the animation for these two cases.

For the demonstrations, the state regularizer weight was set to $2 \times 10^4$, the velocity regularizer weight was set to $1 \times 10^{-4}$, and the threshold was set to $1.11 \times 10^{-5}$ (corresponding to 90 percent of the rated maximum actuator velocity). For the unregularized version, the target is tracked perfectly (with mean positional error 0.02 mm and maximum error 3.89 mm (at first singularity), but the peak joint velocity was 147.04 rad/s which cannot be realized. With the regularized version, the peak joint velocity was 5.90 rad/s, the mean positional error for the sequence was 1.66 mm, and the peak error at the singularity was 24.03 mm. Reviews of video of the testing showed that the different motion sequences could be seen on both the simulated and physical robots 810, 820, and there was excellent agreement between the two.

Figure 9:
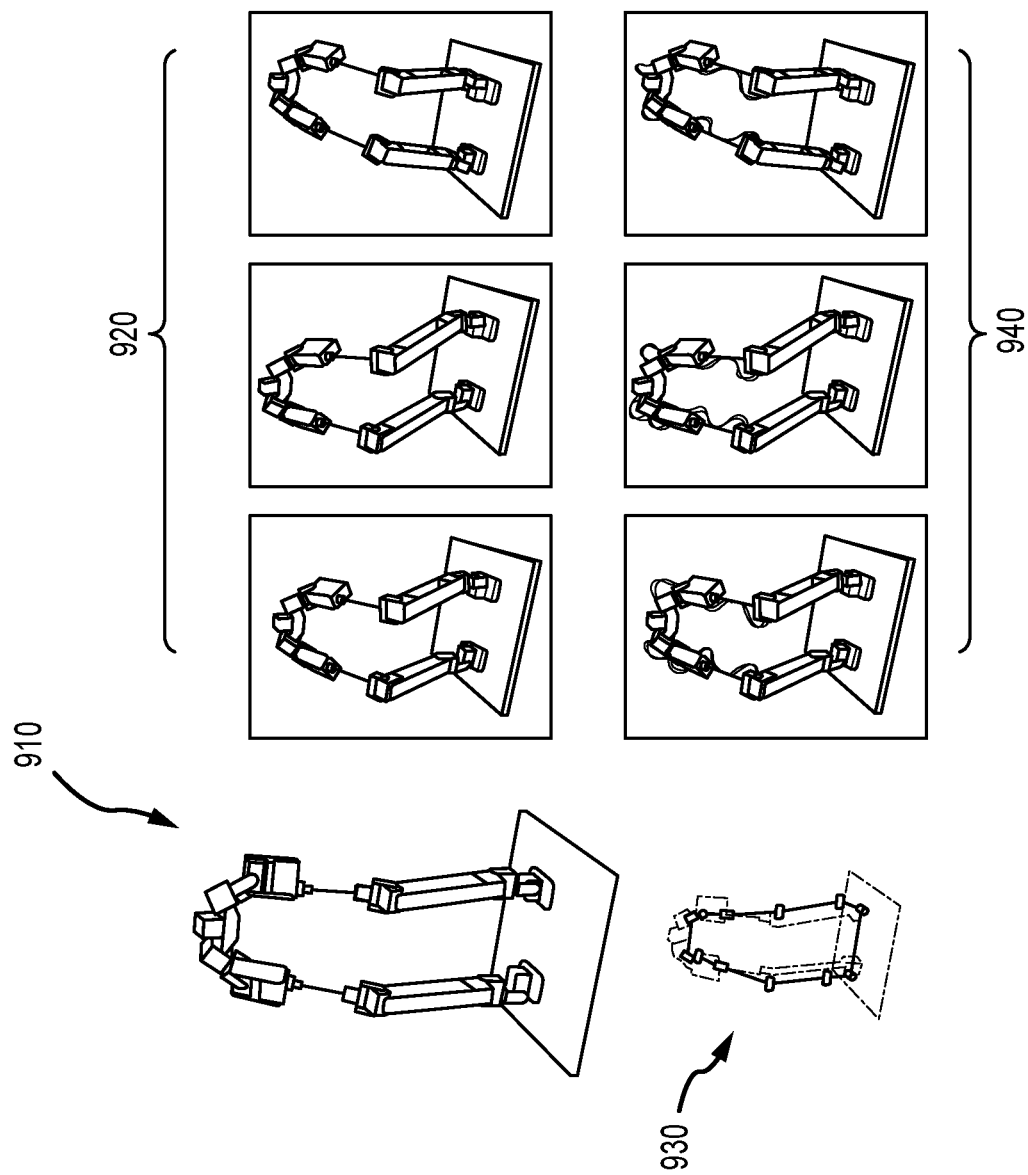
FIG. 9 illustrates input motions for a simulated dancer robot along with a schematic view showing the actuator and passive components and frames on a physical robot upon retargeting of input motions.

FIG. 9 illustrates input motions for a simulated dancer robot (neutral pose at 910 and frames from dancing sequence simulation at 920). FIG. 9 also shows a schematic view 930 of this robot showing the actuator and passive components along with frames 940 on a physical robot upon retargeting of input motions 920. The kinematic structure of the robot in frames 940 was a 6-DoF kinematic structure with 12 joints and 8 actuators, that allowed for expressive hip motion. In the demonstrations, it was seen (as shown in part with frames 940) that by taking the simulated dancing frames 920 as input motions and using the new IK formulation, the tracked frame on the pelvis in the physical robot could also be seen.

FIG. 9 provides some results of a demonstration or validation process for non-trivial parallel kinematics. The robot for this demonstration included a pair of animatronic legs featuring a novel kinematic structure that allows it to perform highly expressive motions, in particular with the hips. In this exemplary case, the feet were fixed in place so that overall the mechanism forms a kinematic loop with twelve components and twelve joints. As an animation input, the inventors used a dancing sequence 920. As the robot had 6 degrees of freedom, a single frame attached to the pelvis was sufficient for uniquely specifying the robot motion. Actuators were placed at eight of the joints, which made the robot overactuated. This means that singularities in the operating range could be eliminated. The IK formulation handled the overactuation without modification. During the testing or demonstration, the regularization weight was set to $1 \times 10^{-6}$. The frames 940 from the resulting sequence (with the robot controlled based on retargeted motions from the IK formulation) are shown in FIG. 9. The IK tracks the animation input 920 perfectly or nearly so, with maximal positional and rotational objective errors of $2.46 \times 10^{-5}$ mm and $1.22 \times 10^{-5}$ rad, respectively.

FIG. 10 illustrates results of a validation demonstration for the IK formulation on a walker robot starting from a walking animation (input motions) 1010 showing 1020 that track frames are attached to the pelvis and feet. At 1030, FIG. 10 shows that a naïve motion retargeting with the IK formulation as shown with simulation 1032 and physical results 1034 is visually close to the input but the robot falls over as the CoM does not project into the support. However, with CoM-optimized retargeting 1040 the simulated results 1042 visually match the input and the motion is successfully retargeted onto the walking robot as shown at 1044 so that the robot does not fall over (1010 motion is fully feasible).

This demonstration provides an additional successful demonstration of the inventors' pipeline in which a serial-parallel bipedal walking robot was considered. This robot featured a novel 6-DoF leg mechanism where a single actuator was placed in the foot and the remaining five actuators were placed in the hips, which reduced the moving mass of the leg. The new IK formulation proved, with this demonstration to be compatible with arbitrary kinematic structures and did not struggle with non-parallel joints.

For slow walking, a quasi-static approach is sufficient. The requirement for stable bipedal walking is then that the overall CoM of the robot projects into the support polygon spanned by the feet currently in contact with the ground. The input 1010 may include the walking animation 110 of FIG. 1, and the animated character may have a "normal" joint configuration with hips, knees, and ankles. The IK pipeline takes care of retargeting this onto the serial-parallel leg mechanism shown in FIG. 10. As shown at 1030, the IK pipeline or formulation may first perform a naïve motion retargeting by tracking frames on the two feet and on the pelvis. While the motion is visually close to the input animation as shown at 1032 (with a maximum tracking error of 0.51 mm in some testing), the physical robot falls over immediately as the CoM does not project into the support with this naïve retargeting as shown at 1034. For this retargeting, the regularization weight was set to $1 \times 10^{-2}$.

As a next step in this demonstration of the 1K formulation, a CoM objective was added to the IK. The feet objective weights were set to [100, 100, 100] and [10, 10, 10] for the orientation and position, respectively. The orientation weight is high, as the size of the feet means that orientation errors cause dragging on the ground. The CoM position weight was set to [10, 0, 10] (with y being the vertical direction), and the pelvis frame weight was set to [0, 1, 0]. The pelvis frame weigh was set lower because it is not critical for the robot's function in this example. In the single-support phase of the gait, the CoM was asked to lie within the support of that foot, and, in the dual-support phase, the CoM was asked to move along a line connecting the two feet. A maximum positional tracking error of the frames was achieved of 1.11 mm, and a maximum tracking error for the CoM objective was achieved of 1.30 mm. Moreover, as shown at 1040 with simulation 1042 and the physical robot results 1044, the robot was able to walk without falling over.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The inventors devised a versatile inverse kinematics for the retargeting of expressive motions onto complex robots with kinematic loops. Compared to state-of-the-art approaches typically used for parallel and series-parallel robots, the new IK formulation supports arbitrary mechanism topologies. In the IK formulation, all types of singularities were regularized including velocities with a regularizer(s).

We claim:

1. A robot, comprising:
    a kinematic structure with mechanical joints, bodies interconnected with the mechanical joints, and at least one actuator for imparting movements to the kinematic structure; and
    a controller generating control signals to operate the kinematic structure to selectively move the at least one movable body,
    wherein the controller includes an inverse kinematics (IK) solver,
    wherein the controller processes input motions with the IK solver by solving inverse kinematics to retarget the input motions onto the kinematic structure with the control signals,
    wherein the IK solver solves the inverse kinematics by applying kinematic constraints to at least one of the mechanical joints to prevent disassembly of the kinematic structure, and by applying soft constraints to an IK target associated with a point on the kinematic structure, and
    wherein the solving of the inverse kinematics is configured to prevent velocity singularities when the kinematic structure operates based on the control signals.

2. The robot of claim 1, wherein the soft constraints for the IK target are met during the solving of the inverse kinematics by minimizing distances between a target trajectory and a retargeted trajectory for the IK target while ensuring the retargeted input motions are physically feasible for the kinematic structure.

3. The robot of claim 1, wherein the kinematic structure is configured to include at least one kinematic loop.

4. The robot of claim 1, wherein the IK solver uses a center of mass (CoM) module defining a trajectory objective for the CoM of the kinematic structure to follow while carrying out the retargeted input motions, the target objective causing the CoM of the kinematic structure to project into a support spanned by dynamically changing contact areas with the ground.

5. The robot of claim 1, wherein the bodies include at least one rigid component and wherein the solving of the inverse kinematics includes tracking movement of the at least one rigid component defined in the input motions in the retargeted input motions.

6. The robot of claim 5, wherein the tracking of the movement of the at least one rigid component includes tracking a position, an orientation, or a frame attached to the at least one rigid component.

7. A robot, comprising:
    a mechanical system with one or more movable bodies; and
    a controller generating control signals causing the mechanical system to move the one or more movable bodies,
    wherein the controller includes an inverse kinematics (IK) solver,
    wherein the controller generates the control signals by processing input motions with the IK solver by using inverse kinematics to retarget the input motions on the mechanical system,
    wherein the IK solver uses a center of mass (CoM) module defining a trajectory objective for the CoM of the mechanical system to follow while carrying out the retargeted input motions,
    wherein the IK solver solves the inverse kinematics by applying kinematic constraints to mechanical joints of the mechanical system to prevent disassembly of the mechanical system, and
    wherein the trajectory objective for the CoM of the mechanical system causes the CoM to project into a support for the mechanical system spanned by dynamically changing contact areas with the ground.

8. The robot of claim 7, wherein the one or more movable bodies include a rigid component and the retarget input motions cause the rigid component to track position and orientation objectives determined based on the input motions.

9. The robot of claim 7, wherein the IK solver further includes a regularizer smoothing the retargeted input motion to prevent velocity singularities.

10. The robot of claim 7, wherein the mechanical system is configured to include at least one kinematic loop.

11. The robot of claim 7, wherein the retargeted input motions include a trajectory for an IK target associated with the mechanical system.

12. The robot of claim 11, wherein the IK solver solves the inverse kinematics by applying soft constraints to IK targets associated with points, orientations, or frames rigidly attached to at least one of the one or more movable bodies.

13. A robot, comprising:
    a kinematic structure with mechanical joints, bodies interconnected with the mechanical joints, and at least one actuator for imparting movements to the kinematic structure; and
    a controller generating control signals to operate the kinematic structure to selectively move the at least one movable body,
    wherein the controller includes an inverse kinematics (IK) solver,
    wherein the controller generates the control signals by processing input motions with the IK solver by solving inverse kinematics to retarget the input motions onto the kinematic structure, wherein the IK solver solves the inverse kinematics by applying kinematic constraints to at least one of the mechanical joints to prevent disassembly of the kinematic structure, and wherein the solving of the inverse kinematics is configured to prevent velocity singularities when the kinematic structure operates based on the control signals to move with the retargeted input motions.

14. The robot of claim 13, wherein the IK solver solves the inverse kinematics by applying hard the mechanical constraints to at least one of the bodies and by applying soft constraints to an IK target associated with the kinematic structure.

15. The robot of claim 13, wherein motion inputs are processed by a motion planner to determine a set of input trajectories for processing by the controller to generate the control signals.

16. The robot of claim 15, wherein the motion inputs processed by the motion planner include an animation for a character and wherein the motion planner further receives sensor data from a sensing system for an environment in which the robot is positioned that is processed to generate the set of input trajectories adapted to the sensed environment.

17. The robot of claim 13, wherein the IK solver uses a center of mass (CoM) module defining a trajectory objective for the CoM of the kinematic structure to follow while carrying out the retargeted input motions.

18. The robot of claim 17, wherein the trajectory objective of the CoM causes the CoM to project into a support spanned by dynamically changing contact areas with the ground.

* * * * *